L. G. JACKSON.
Combined Harrows and Seeders.
No. 138,806. Patented May 13, 1873.
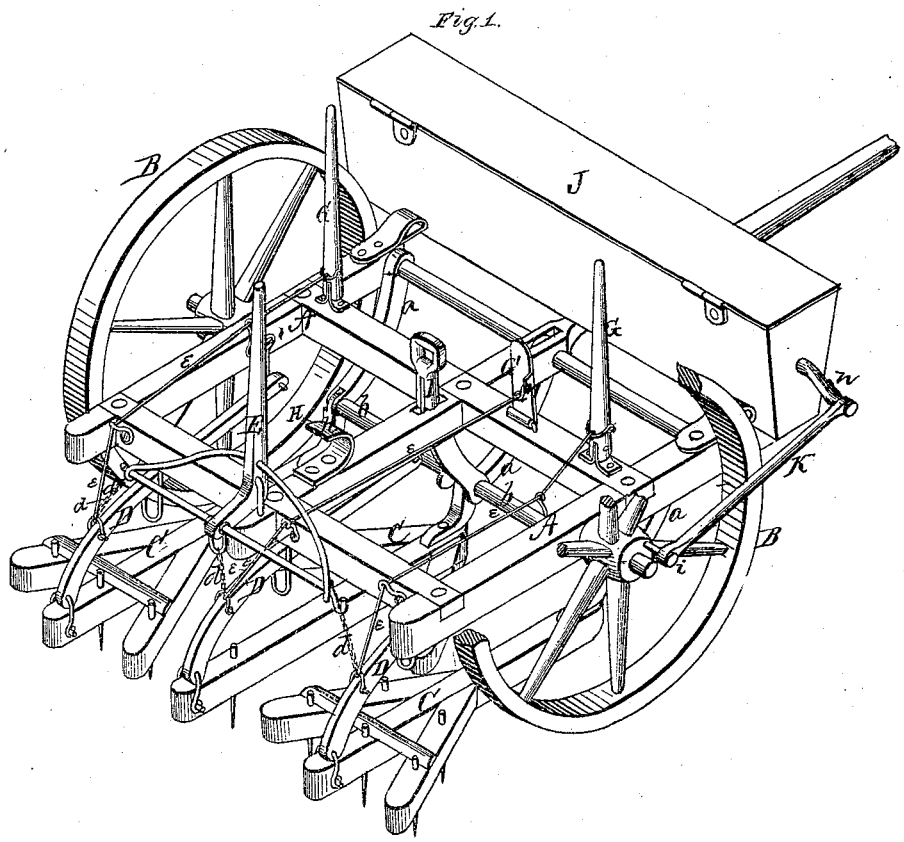
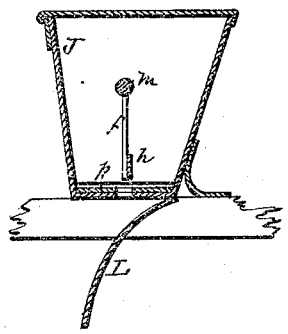
Witnesses
John A. Ellis
Edward E. Ellis
Inventor
Loren G. Jackson
Per
J. H. Alexander & Co
Atty's

UNITED STATES PATENT OFFICE.

LOREN G. JACKSON, OF MARION, ASSIGNOR OF ONE-HALF HIS RIGHT TO CHARLES WOOD AND ALBERT ELLIS, OF WOODMAN, WISCONSIN.

IMPROVEMENT IN COMBINED HARROWS AND SEEDERS.

Specification forming part of Letters Patent No. 138,806, dated May 13, 1873; application filed March 31, 1873.

*To all whom it may concern:*

Be it known that I, LOREN G. JACKSON, of Marion, in the county of Grant and State of Wisconsin, have invented certain new and useful Improvements in Combined Harrow and Seeder; and I do hereby declare that the following is a full, clear, and exact description thereof, reference being had to the accompanying drawing and to the letters of reference marked thereon, which form a part of this specification.

The nature of my invention consists in the construction and arrangement of an improved sulky harrow and seeder, whereby a strong, durable, and economical device for the purpose is obtained, and one that can be manufactured at a small cost.

In order to enable others skilled in the art to which my invention appertains to make and use the same, I will now proceed to describe its construction and operation, referring to the annexed drawing, in which—

Figure 1 is a perspective view of my machine, and Fig. 2 is a transverse vertical section of the seed-box in the same.

A represents a suitable frame mounted upon two wheels, B B. At the front end of this frame are attached three small V-shaped harrows, C C C, by means of curved coupling-arms $a\ a$. Each of these arms is hinged or pivoted at the front of the same, and the harrows are hinged or pivoted to the rear ends of said arms by means of a rod, $b$, passing through all of them, as shown. The rear end of each harrow is supported by a curved bar, D, the front end of which is hinged or pivoted to the frame A and the rear end to the harrow. These bars D D are, by chains $d\ d$, connected with a hand-lever, E, by means of which the harrows can be raised or lowered at will by the driver seated upon his seat at H. The harrows can also be elevated by the cords $e\ e$ attached to the levers G G and foot-board G' in front of the driver, by which arrangement either harrow can be elevated independent of the others. The front ends of the harrows are elevated by a handle, I, attached to the rod $b$, which is used in passing obstructions and in going upon the road. Upon the front of the machine is placed a seed-box, J, within which is an agitator, consisting of a bar, $h$, extending the whole length of the box, and connected, by means of arms $f\!f$, with a shaft, $m$, passing longitudinally through the box. This agitator is operated by a wrist-pin, $i$, on one of the wheels, connected, by a rod or pitman, K, with a crank, $n$, on the end of the shaft $m$. With this device an even amount of seed is forced through openings in the bottom of the seed-box, which openings may be regulated, by means of a slide, $p$, in the bottom of the box, to admit of any desired amount of seed being sown to the acre. L represents the seed-board, over which the seed is scattered as it passes from the seed-box J.

Having thus fully described my invention, what I claim as new, and desire to secure by Letters Patent, is—

1. The harrows C C C, connected, by the arms $a\ a$ and D D, to the frame A, substantially as herein set forth.

2. The combination, with the harrows C C C and arms $a\ a$ and D D, of the chains $d\ d$, lever E, cords $e\ e$, levers G G, and foot-board G', all arranged as described, whereby all the harrows may be raised simultaneously or each one separately independent of the others, as herein set forth.

In testimony that I claim the foregoing as my own I affix my signature in presence of two witnesses.

LOREN GRANT JACKSON.

Witnesses:
   J. L. PARKER,
   J. W. HORSFALL.